(12) United States Patent
Kelly

(10) Patent No.: US 11,223,263 B2
(45) Date of Patent: Jan. 11, 2022

(54) ROTARY GENERATORS

(71) Applicant: GreenSpur Renewables Limited, London (GB)

(72) Inventor: Hugh-Peter Granville Kelly, Essex (GB)

(73) Assignee: Time To Act Limited, Hatfield (GB)

( * ) Notice: Subject to any disclaimer, the term of this patent is extended or adjusted under 35 U.S.C. 154(b) by 0 days.

(21) Appl. No.: 16/464,447

(22) PCT Filed: Dec. 1, 2017

(86) PCT No.: PCT/GB2017/053637
§ 371 (c)(1),
(2) Date: May 28, 2019

(87) PCT Pub. No.: WO2018/100396
PCT Pub. Date: Jun. 7, 2018

(65) Prior Publication Data
US 2020/0052564 A1    Feb. 13, 2020

(30) Foreign Application Priority Data
Dec. 2, 2016    (GB) ...................................... 1620520

(51) Int. Cl.
*H02K 21/24*    (2006.01)
*H02K 16/02*    (2006.01)
(Continued)

(52) U.S. Cl.
CPC ........... *H02K 21/026* (2013.01); *H02K 16/02* (2013.01); *H02K 21/12* (2013.01); *H02K 21/24* (2013.01); *H02K 7/1838* (2013.01)

(58) Field of Classification Search
CPC ........ H02K 1/182; H02K 1/2193; H02K 3/47; H02K 5/16; H02K 5/167; H02K 5/173;
(Continued)

(56) References Cited

U.S. PATENT DOCUMENTS 3,320,454 A * 5/1967 Kober ............... H02K 21/24
                                                   310/268
5,945,766 A * 8/1999 Kim ..................... H02K 16/00
                                                   310/268
(Continued)

FOREIGN PATENT DOCUMENTS

DE    102009017839 A1    10/2010
EP        2369720 A1     9/2011
(Continued)

OTHER PUBLICATIONS

GB Search Report; UK IPO; dated Jun. 1, 2017; 4 pages.
(Continued)

*Primary Examiner* — Quyen P Leung
*Assistant Examiner* — Eric Johnson
(74) *Attorney, Agent, or Firm* — Hall Estill Law Firm

(57) ABSTRACT

An axial flux rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus, means provided at or towards the central aperture of the coil annulus axial to resist flexure of the coil annulus.

25 Claims, 4 Drawing Sheets

(51) Int. Cl.
 *H02K 7/18* (2006.01)
 *H02K 21/02* (2006.01)
 *H02K 21/12* (2006.01)

(58) Field of Classification Search
 CPC ........ H02K 7/18; H02K 7/1823; H02K 7/183;
  H02K 7/1838; H02K 16/00; H02K 16/02;
  H02K 21/12; H02K 21/24; Y02E 10/72
 USPC .................................................. 290/44, 45
 See application file for complete search history.

(56) References Cited

U.S. PATENT DOCUMENTS

| | | | |
|---|---|---|---|
| 10,355,570 B2* | 7/2019 | Inoue | H02K 21/24 |
| 2005/0140244 A1 | 6/2005 | Yamada et al. | |
| 2005/0269885 A1* | 12/2005 | Knox | F04D 13/12 |
| | | | 310/87 |
| 2007/0152536 A1 | 7/2007 | Chuang et al. | |
| 2008/0231132 A1* | 9/2008 | Minowa | H02K 21/24 |
| | | | 310/114 |
| 2008/0292467 A1 | 11/2008 | Borgen | |
| 2009/0243301 A1* | 10/2009 | Longtin | H02K 7/088 |
| | | | 290/55 |
| 2011/0233938 A1* | 9/2011 | Stiesdal | H02K 1/182 |
| | | | 290/55 |
| 2011/0273048 A1 | 11/2011 | Jore et al. | |
| 2011/0309726 A1* | 12/2011 | Carpenter | H02K 5/1282 |
| | | | 310/75 R |
| 2012/0262095 A1 | 10/2012 | Smith et al. | |
| 2015/0207381 A1 | 7/2015 | Hauck et al. | |

FOREIGN PATENT DOCUMENTS

| | | |
|---|---|---|
| GB | 2538516 A | 11/2016 |
| JP | S59127556 A | 7/1984 |
| JP | 2006067650 A | 3/2006 |
| JP | 2011205888 A | 10/2011 |
| WO | 8502503 A1 | 6/1985 |
| WO | 2016079537 A1 | 5/2016 |
| WO | 2016113567 A1 | 7/2016 |
| WO | 2016185216 A1 | 11/2016 |

OTHER PUBLICATIONS

EPO Exam Report; Application No. 17811360.1; dated Oct. 5, 2020; 10 pages.
JP2019-529520; "Japanese Examination Report", dated Oct. 5, 2021; 22 pages.

* cited by examiner

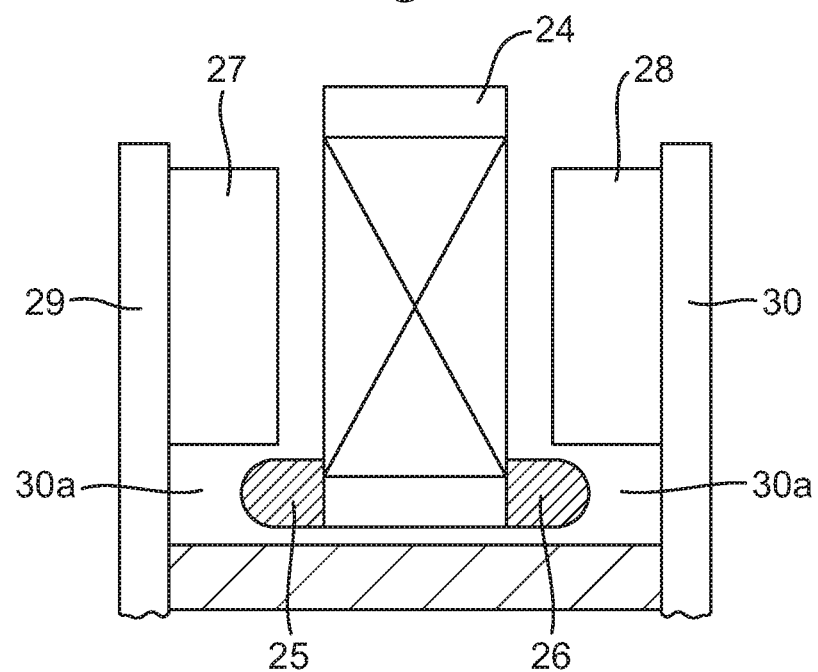
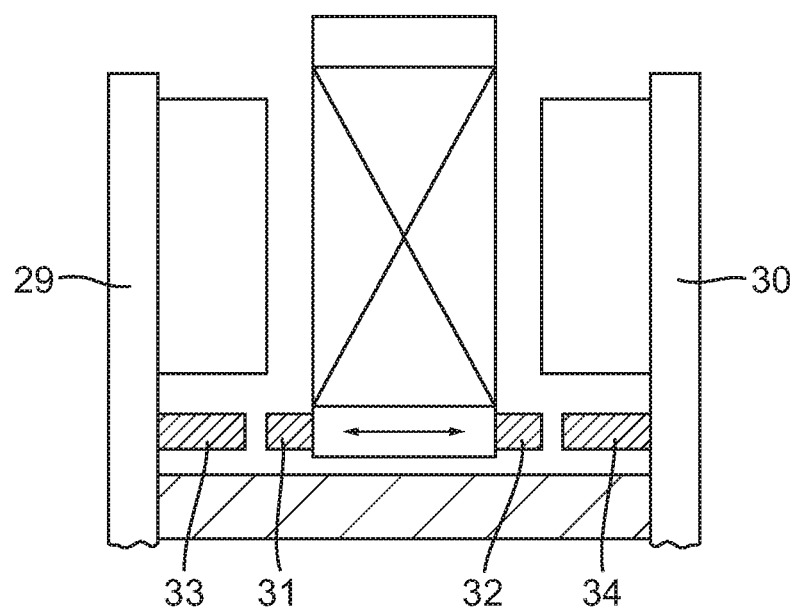

ROTARY GENERATORS

CROSS-REFERENCE TO RELATED APPLICATIONS

The present application is a national stage application of a PCT application having International Application No. PCT/GB2017/053637, filed Dec. 1, 2017, which claims priority to GB1620520.5, filed Dec. 2, 2016, which claims the benefit under 35 U.S.C. 119(e), the disclosure of which is hereby expressly incorporated herein by reference.

The following invention relates to improvements to the construction of stators and rotors of axial flux generators, and in particular to those of a generator of the type disclosed in my patent applications, nos. GB 2520516 & GB 2532478 & GB 2538516.

In such a form of generator, a series of spaced in-line annular rotors, populated on both sides with permanent magnets, sandwiches a series of in line coil carrying annular stators. Annular collars affixed to and intermediate of the inner portions of the rotors maintain their separation as well as the required minimal air gaps between the surfaces of the rotor magnets and the stators. The inner diameter of the stator annuli is adequate to clear the collars situate therethrough. The series of rotors is bound together by draw bolts, passing through both the rotors and the collars separating them, and is rotatably driven by external means—such as the rotor of a wind turbine—to rotate relative to the stators. Magnetic flux passing from the permanent magnets on one rotor across the air gap to the magnets on the facing rotor, cuts the turns of the stator coils sandwiched between them resulting in the generation of electromagnetic forces.

For specific applications, especially the use of such a generator in slow rotation direct drive applications, it is desirable for the rotors and stators to be of a substantial diameter. The reason being that generation of electricity within a conductor is—in accordance with Fleming's rule—proportional to the rate at which flux cuts it. Thus the greater the diameter, the greater the rate at which the magnetic flux provided by the rotors cuts the turns of the coils mounted within the stators. By utilising wide diameter arrangements, this can therefore compensate—in direct drive arrangements—for the absence of a traditional gearbox to speed up the rate of rotation.

The present invention provides an axial flux rotary generator comprising: two magnetic annuli; a coil annulus mechanically braced at an outside periphery; the magnetic annuli and coil annulus having a common axis; the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus; and means provided at the central aperture of the coil annulus to resist axial flexure of the coil annulus.

Thus, according to the invention, means are provided at or towards the central aperture of the stators (coil annulus) of a generator of the type described herein to prevent or to substantially prevent the degree to which, in use, axial flexure of the stators can occur away from their designated registrations along the length of the generator. In particular this applies to generators in which the stator (coil annulus) diameter is at least thirty or more times its axial thickness (excluding the means to resist axial flexure). For generators in which the stator diameter is at least fifty or more times its axial thickness, there is even higher risk of axial flexure occurring without the means to resist axial flexure of the present invention. This addresses the problem of possible axial flexing of the stator which could lead to damage.

According to a first aspect of the invention, the aforesaid means may be in the form of one or more stiffening members, preferably themselves annular, affixed to the central portion of a stator on one or both sides thereof and formed of a material designed to dampen any propensity of the stator to flex axially. In a feature of this first aspect, an annular recess may be provided upon the rotor plates, or within the collars separating them, to accommodate the said stiffening means.

In an embodiment the means to resist axial flexure comprises a bearing. This is advantageous, particularly in a preferred embodiment where the bearing is a contact type bearing, as such a component is able to resist greater axial flexure than a stiffening member.

According to a second aspect of the invention, the aforesaid means for limiting axial flexure of the stators comprises a plastics bearing surface located upon the stator, acting in sliding contact, or close to sliding contact, with a similar bearing surface mounted upon the rotors on either side of it. The presence of the bearing surfaces makes physically impossible any significant axial flexure of the stator plate. As an alternative to the bearing surface being mounted upon the rotor, this can be mounted instead upon the collars separating the rotors.

For especially large stators and rotors, it may be preferable to implement more durable and hard wearing alignment means rather than the use of plastics bearing plates. In this case, a formal cage bearing arrangement may be used, in which the inner race of an annular bearing is mounted upon the surface of the collar separating the rotor plates, or within a groove upon it, and the outer cage is mounted upon the inner area of the stator plate, or even within and upon the inside cylindrical surface defining its inner diameter.

It is important for the sake of optimising generation that as much area as possible of a stator plate should be occupied by emf generating coils. For this reason, it is desirable for any of the foregoing arrangements not to monopolise any part of this generation area. In an embodiment the axial flux rotary generator further comprises a collar which extends between the magnetic annuli (which may be in the form of plates onto which magnets are mounted). Preferably the annular collar is spaced from the common axis. According to an aspect of the invention, the means of the invention for limiting or preventing axial deflection of the stator plate is accommodated within one or more circumferential grooves in the annular collar separating the rotor plates. The bulk of the stator plate thus remains free for accommodating the coils.

In an embodiment a part of the means to resist axial flexure is mounted on the collar. This is advantageous as maximum mechanical advantage can be obtained because in this way the coil annulus has the means for flexure attached at the very end of the coil annulus. In an embodiment at least a part of the coil annulus extends into the one or more circumferential grooves and this further increases the strength of the assembly whilst maximising the area which can be occupied by the components generating electricity.

Any of the aforegoing arrangements provide solutions with varying degrees of efficacy for limiting or overcoming in use axial flexure of the generator's stators with consequent damage to their surfaces and those of the rotors on either side of it.

According to yet a further aspect of the invention, channels are provided to enable lubrication of the bearing surfaces/means at scheduled maintenance intervals.

In an embodiment the means to resist axial flexure is radially inward of all coils of the coil annulus. Thus the outer area of the coil annulus can be occupied by coils for electricity generation whereas the inner periphery of the coil annulus can accommodate the means to resist axial flexure. Thus the means to resist axial flexure is at the location where most mechanical advantage is available and where electricity generation is least efficient.

The invention will now be described with reference to the accompanying drawings in which:

FIG. 2 shows a first form of arrangement to limit stator axial flexure;

FIG. 3 shows a second form of arrangement for limiting axial flexure;

Figure 1A:
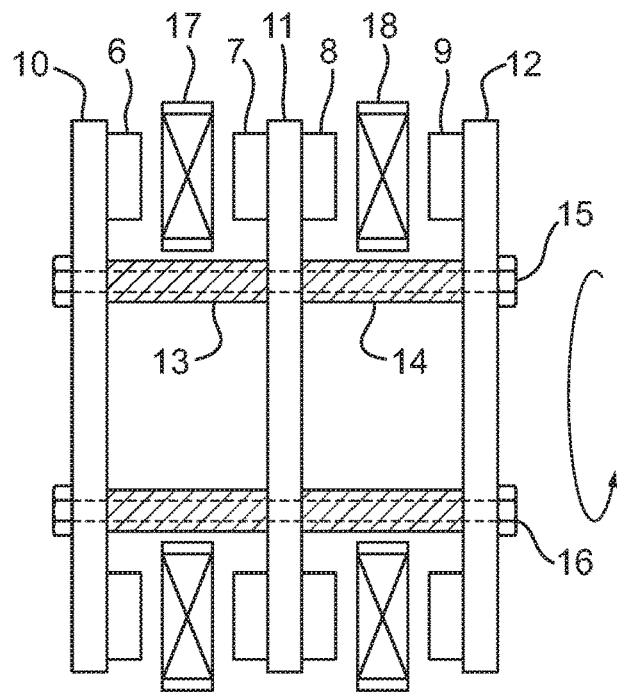
FIG. 1a shows an exploded view of a generator of the type to which the present invention may be applied and FIG. 1b shows a stator and rotors to scale.

Referring to FIG. 1a, annular magnet bearing rotors of an axial flux generator are shown at 10, 11 and 12. The magnets 6, 7, 8 & 9 mounted around the peripheries of rotors to form magnetic annuli face each other across an air gap. Annular collars 13 and 14 extending between and separating the rotors 10-12 at their inner portions and maintain a precise spacing between them. The annular collar is spaced from the common axis. The rotors 10-12 and collars 13, 14 are bound together by draw bolts, 15 and 16. Coil carrying stators 17 and 18 form coil annuli and are sandwiched between the three rotors 10-12.

The magnetic annuli and coil annuli have a common axis. Two magnetic annuli define a plurality of magnetic fields around the common axis extending across the gap between the two magnetic annuli. The sequence of coils of the coil annuli around the common axis in the gap are such that lines of magnetic flux from the magnetic fields cut the turns of the coils and thus induce electric current in the coils as the magnetic annuli are caused to rotate relative to the coil annulus.

For certain applications, very large diameter generators may be utilised having diameters of five six or even seven meters. These are needed where the rate of rotation of the rotors is particularly slow, for example as when directly driven by the rotor of a wind turbine. Examples could be as low as 16 or 14 rpm. The peripheral speed of the rotors acquired through their sheer diameter, and thus the increased rate at which lines of flux from their magnets cuts the coils sandwiched between them, compensates for the absence of a gearbox to speed up the rate of rotation to the normal ranges of rpm associated with small diameter rotary generators, for example 1500 rpm.

Figure 1B:
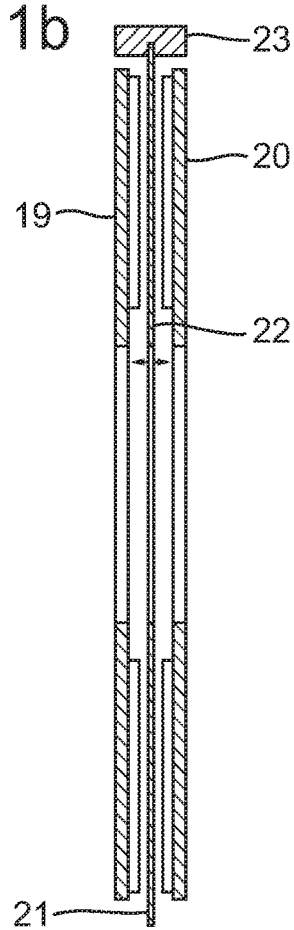

An example is shown to scale at FIG. 1b of such a large diameter arrangement. A large diameter annular stator is in effect simply a thin plate having a central aperture. Two rotors 19 and 20, sandwich a stator 21. In current designs there is no form of axial support for the stator towards its centre portion, 22. Mechanical bracing is available at the outside periphery of the stator, as shown at 23, to keep the stator aligned correctly between its rotor plates, but its effectiveness reduces towards the central area. The majority of the stator's area is inaccessible, being as it is closely sandwiched between the substantially equal diameter rotors on either side of it. Typically, a stator may be of diameter seven meters, but only 50 mm in axial thickness. This renders it in effect flimsy in an axial sense towards its centre, and vulnerable to axial perturbations. The physics of the forces arising during generation dictate that the torque experienced by the coils should lie entirely in a planar sense and therefore within the plane of the stator and so developers have assumed that very axially thin coil annuli, which are preferred in terms of having a small gap between magnetic annuli and so increase generation efficiency and to keep costs low are sufficient. However, the present inventor has surprisingly found experimentally that parasitic forces may arise resulting also in axial flexure of the stator, as shown by the arrow. In the real world there is a real risk that any vibrations arising in the axial sense during operation of the generator, as might be caused by asymmetrical cyclic forces experienced by the stator coils as emfs are generated within them, could result in the surfaces of the stators scraping against the rotor mounted magnets on either side of them. Heavy and possibly catastrophic damage can result.

A first method of addressing this is shown with reference to FIG. 2. This shows in expanded detail the upper half central area of the generator of FIG. 1. The stator 24 of the coil annulus is shown in this case fitted with a means to resist axial flexure in the form of annular stiffening members 25 and 26 constructed from materials and to dimensions designed to limit any tendency to axial flexure. The annular stiffening members effectively increase the axial thickness of the coil annulus at a radially inner portion. The annular stiffening members may be integral or non-integral with the plate forming the stator in which the coils are embedded. The radial lengths of magnets 27 and 28 mounted around the rotors 29 and 30 of the magnetic annuli are limited in length to provide a recess 30a to accommodate the annular stiffening members 25, 26. The means to resist axial flexure are radially inward of all coils thereby to give over as much space as possible to the electricity generating components and to achieve best mechanical advantage.

A second method is shown with reference to FIG. 3. In this case, rather than the annular stiffening members of FIG. 2, the means to resist axial flexure is a bearing, for example a contact bearing. In the example of FIG. 2 the inner portions of the stator plate are equipped with bearing proprietary plastics surfaces, 31 and 32. The rotors are similarly equipped as shown at 33 and 34. In the event of any tendency of the stator to move in the axial sense, the bearing plates are present to prevent this. To avoid excessive wear, the plates need not be in permanent contact, thus a small airgap is present between them as shown.

Figure 4:
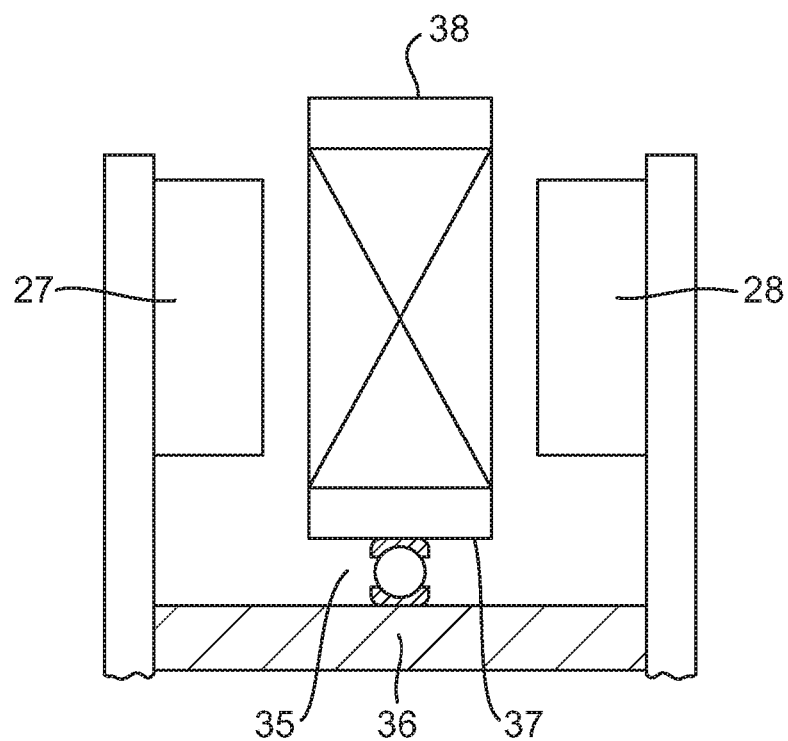
FIG. 4 shows a third form of arrangement for limiting axial flexure.

A third method is shown with reference to FIG. 4. For especially heavy duty applications, for example generators generating at the rate of 1 MW or more, and where parasitic axial forces may be greater/more apparent, it may be desirable to utilise a more heavy duty solution to overcome entirely any propensity for stator axial vibrations or movement.

In this case, a formal annular ball race or equivalent may be utilised, as shown at 35. A part of the means to resist axial flexure, for instance the inner portion of the ball race, is affixed to the central collar 36, and the outer portion to the inside circular face 37 of the stator 38. In this case, and given the precision with which such bearings are now manufactured and assembled, virtually no movement in the axial sense is possible.

Figure 5A:
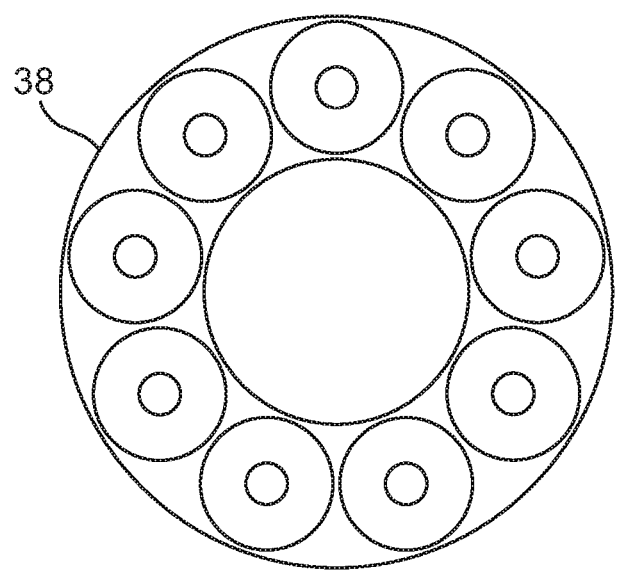
FIG. 5a shows a coil annulus populated with coils.

It is important for any generator of this form of construction for as much stator area as possible to be utilised and populated with coils, an example being shown at FIG. 5a. The greater the number of turns, the greater the output.

Figure 5B:
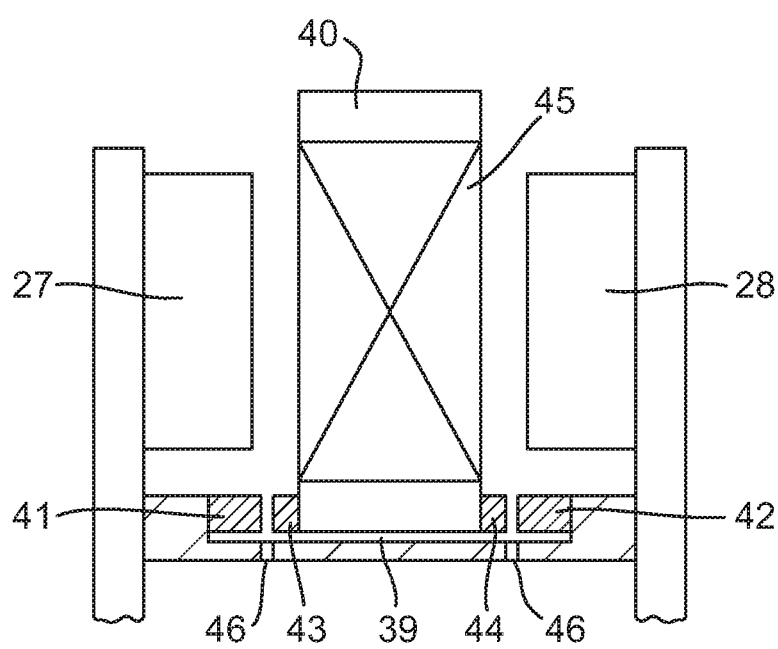
FIG. 5b shows means for lubricating the means of FIGS. 2 to 4 during use.

A method of ensuring that any of the foregoing arrangements do not impinge on this generating area is shown at FIG. 5b. Rather than the surface arrangements shown at FIGS. 2 to 4, a groove may be provided in the central collar as shown in FIG. 5b at 39. The stator 40 can "dip into" or project into this groove, with any of the aforegoing disclosed movement constraining methods being confined to this area. In the case shown at FIG. 5b, bearing plastics are shown within the groove at 41, 42, and upon the stator at 43 and 44. As can be seen in comparison with FIG. 4, this enables both the magnets 27 and 28 to be longer in radial length and similarly the stator coil 45, thereby facilitating an increase in the emfs generated.

As part of the routine maintenance of a generator equipped with the means of the present invention, it may be desirable to provide lubrication periodically. Lubrication grooves or channels 46 are to this end located through the collar, reaching into the groove 39 to allow for suitable lubricants to reach the operative surfaces from the inside of the annular collars 13, 14.

Numerous variations will be apparent to those skilled in the art.

The invention claimed is:

1. An axial flux rotary generator comprising:
    two magnetic annuli;
    an annular collar which extends between and separates the magnetic annuli and maintains a spacing between them;
    a coil annulus mechanically braced at an outside periphery;
    the magnetic annuli and coil annulus having a common axis, the magnetic annuli extending closer to the common axis than the annular collar;
    the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus; and
    one or more stiffening members provided at the central aperture of the coil annulus to resist axial flexure of the coil annulus;
    wherein at least a part of the one or more stiffening members is accommodated within one or more circumferential grooves in the annular collar.

2. The axial flux rotary generator of claim 1, wherein the stiffening members are themselves annular, affixed to the central portion of the coil annulus on one or both sides thereof and preferably formed of a material designed to dampen any propensity of the coil annulus to flex axially.

3. The axial flux generator of claim 1, wherein at least a part of the coil annulus extends into the one or more circumferential grooves.

4. The axial flux generator of claim 1, wherein the annular collar is spaced from the common axis.

5. The axial flux rotary generator of claim 1, wherein the coil annulus has a diameter which is at least thirty or more times the axial thickness of the coil annulus.

6. The axial flux generator of claim 1, wherein the one or more stiffening members are radially inward of all coils of the coil annulus.

7. The axial flux rotary generator of claim 1 wherein the annular collar is a single piece of material.

8. The axial flux rotary generator of claim 1 wherein the magnetic annuli and the annular collar are bound together by a single draw bolt.

9. The axial flux rotary generator of claim 1 wherein the axial flux rotary generator is incorporated into a wind turbine.

10. An axial flux rotary generator comprising:
    two magnetic annuli;
    an annular collar which extends between and separates the magnetic annuli and maintains a spacing between them;
    a coil annulus mechanically braced at an outside periphery;
    the magnetic annuli and coil annulus having a common axis, the magnetic annuli extending closer to the common axis than the annular collar;
    the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus; and
    a bearing or an annular ball race or equivalent, provided at the central aperture of the coil annulus to resist axial flexure of the coil annulus;
    wherein at least a part of the bearing or annular ball race or equivalent is accommodated within one or more circumferential grooves in the annular collar.

11. The axial flux rotary generator of claim 10, further comprising channels provided through the annular collar which extends between the magnetic annuli to enable lubricant to be provided to the bearing or annular ball race or equivalent.

12. The axial flux generator of claim 10, wherein a part of the bearing or annular ball race or equivalent is mounted on the collar.

13. The axial flux generator of claim 10, wherein the magnetic annuli and the annular collar are bound together by draw bolts.

14. The axial flux generator of claim 10, wherein the annular collar is affixed to the magnetic annuli.

15. The axial flux generator of claim 10, wherein the annular collar is affixed to and intermediate of inner portions of the magnetic annuli.

16. The axial flux generator of claim 10, wherein the diameter of the coil annulus is at least fifty times the axial thickness of the coil annulus.

17. The axial flux generator of claim 10, wherein the bearing is a contact type bearing.

18. The axial flux rotary generator of claim 10, wherein the bearing comprises a plastics bearing surface located upon the coil annulus, acting in sliding contact, or close to sliding contact, with a bearing surface mounted upon the magnetic annuli on either side of the plastics bearing surface located upon the coil annulus.

19. The axial flux rotary generator of claim 18, wherein, when stationary, there is a gap between the bearing surface located on the coil annulus and the bearing surface on the magnetic annuli.

20. The axial flux rotary generator of claim 10, wherein an inner portion of the annular ball race is affixed to the annular collar, and an outer portion of the annular ball race is affixed to an inside circular face of the coil annulus.

21. The axial flux generator of claim 10, wherein the bearing or annular ball race or equivalent is mounted on axial surfaces of the coil annulus and the annular collar.

22. The axial flux rotary generator of claim 10 wherein the annular collar is a single piece of material.

23. The axial flux rotary generator of claim 10 wherein the magnetic annuli and the annular collar are bound together by a single draw bolt.

24. The axial flux rotary generator of claim 10 wherein the axial flux rotary generator is incorporated into a wind turbine.

25. An axial flux rotary generator comprising:

two magnetic annuli;

an annular collar which extends between the magnetic annuli;

a coil annulus mechanically braced at an outside periphery;

the magnetic annuli and coil annulus having a common axis the magnetic annuli extending closer to the common axis than the annular collar;

the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus; and a bearing or an annular ball race or equivalent, provided at the central aperture of the coil annulus to resist axial flexure of the coil annulus;

wherein at least a part of the bearing or annular ball race or equivalent is accommodated within one or more circumferential grooves in the annular collar, and wherein the annular collar is spaced from the common axis.

* * * * *

UNITED STATES PATENT AND TRADEMARK OFFICE
CERTIFICATE OF CORRECTION

| | |
|---|---|
| PATENT NO. | : 11,223,263 B2 |
| APPLICATION NO. | : 16/464447 |
| DATED | : January 11, 2022 |
| INVENTOR(S) | : Hugh-Peter Granville Kelly |

It is certified that error appears in the above-identified patent and that said Letters Patent is hereby corrected as shown below:

On the Title Page

Item (54) and in the Specification, Column 1, Line 1, should read:
"IMPROVEMENTS TO ROTARY GENERATORS"

Signed and Sealed this
Tenth Day of January, 2023

Katherine Kelly Vidal
*Director of the United States Patent and Trademark Office*